United States Patent
Namiki et al.

(10) Patent No.: US 12,548,299 B2
(45) Date of Patent: Feb. 10, 2026

(54) DATA AUGMENTATION DEVICE, LEARNING DEVICE, DATA AUGMENTATION METHOD, AND RECORDING MEDIUM

(71) Applicant: NEC Corporation, Tokyo (JP)

(72) Inventors: Shigeaki Namiki, Tokyo (JP); Shoji Yachida, Tokyo (JP); Takashi Shibata, Tokyo (JP); Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 18/014,293

(22) PCT Filed: Jul. 6, 2020

(86) PCT No.: PCT/JP2020/026348
§ 371 (c)(1),
(2) Date: Jan. 3, 2023

(87) PCT Pub. No.: WO2022/009254
PCT Pub. Date: Jan. 13, 2022

(65) Prior Publication Data
US 2023/0252765 A1     Aug. 10, 2023

(51) Int. Cl.
*G06V 10/774* (2022.01)
*G06V 10/74* (2022.01)

(52) U.S. Cl.
CPC .......... *G06V 10/774* (2022.01); *G06V 10/761* (2022.01)

(58) Field of Classification Search
CPC .. G06V 10/774; G06V 10/761; G06V 10/454; G06V 20/54; G06N 20/00; G06T 7/00
See application file for complete search history.

(56) References Cited

U.S. PATENT DOCUMENTS

| 11,604,964 B2* | 3/2023 | Park ..................... G06N 3/0475 |
| 2011/0071965 A1* | 3/2011 | Long ..................... G06N 20/00 706/54 |
| 2017/0300783 A1 | 10/2017 | Kumar et al. |
| 2019/0066493 A1* | 2/2019 | Sohn ........................ G06N 3/08 |

(Continued)

FOREIGN PATENT DOCUMENTS

| JP | 2013-161298 A | 8/2013 |
| JP | 2018-106216 A | 7/2018 |
| JP | 2019-028876 A | 2/2019 |

OTHER PUBLICATIONS

International Search Report for PCT Application No. PCT/JP2020/026348, mailed on Sep. 8, 2020.

(Continued)

*Primary Examiner* — Aaron W Carter
(74) *Attorney, Agent, or Firm* — Sughrue Mion, PLLC

(57) ABSTRACT

In a data augmentation device, a data acquisition means acquires two sets of source domain data of a predetermined class from a data group of a source domain, and acquires one set of target domain data of the predetermined class from a data group of a target domain data. An estimation means estimates a structure of a manifold representing a data distribution of the source domain by using two sets of source domain data. A data generation means generates new data of the target domain by using the one set of target domain data and the structure of the manifold.

10 Claims, 11 Drawing Sheets

(56) References Cited

U.S. PATENT DOCUMENTS

| | | | |
|---|---|---|---|
| 2019/0213039 A1 | 7/2019 | Lecue et al. | |
| 2019/0220977 A1* | 7/2019 | Zhou | G06N 3/084 |
| 2019/0279075 A1* | 9/2019 | Liu | G06N 3/047 |
| 2020/0193269 A1* | 6/2020 | Park | G06V 10/82 |
| 2020/0242736 A1* | 7/2020 | Liu | G06T 11/60 |
| 2020/0321118 A1* | 10/2020 | Kim | G16H 30/40 |
| 2021/0012162 A1* | 1/2021 | Huang | G06V 10/774 |
| 2021/0019636 A1* | 1/2021 | Ishii | G06N 7/01 |
| 2021/0065418 A1* | 3/2021 | Han | G06T 11/60 |
| 2021/0209464 A1* | 7/2021 | Bala | G06F 18/23213 |
| 2022/0114380 A1* | 4/2022 | Sankaradas | G06F 18/2148 |
| 2022/0148244 A1* | 5/2022 | Ko | G06N 3/045 |
| 2022/0198339 A1* | 6/2022 | Zhao | G06N 3/08 |
| 2022/0207865 A1* | 6/2022 | Muhammad | G06F 3/00 |
| 2022/0230066 A1* | 7/2022 | Das | G06N 3/045 |
| 2022/0327385 A1* | 10/2022 | Pan | G06T 5/60 |
| 2022/0343631 A1* | 10/2022 | Namiki | G06V 10/761 |
| 2022/0366242 A1* | 11/2022 | Tsunoda | G06V 10/7715 |
| 2022/0383622 A1* | 12/2022 | Nakai | G06T 7/0002 |
| 2023/0132770 A1* | 5/2023 | Ranipa | G06V 10/82 382/103 |
| 2023/0252765 A1* | 8/2023 | Namiki | G06V 10/761 382/159 |
| 2023/0259827 A1* | 8/2023 | Katoh | G06N 20/00 706/12 |
| 2023/0281974 A1* | 9/2023 | Ramamonjison | G06V 10/764 382/157 |
| 2023/0306306 A1* | 9/2023 | Katoh | G06N 20/00 |
| 2024/0070468 A1* | 2/2024 | Takeshita | G06N 3/096 |
| 2024/0078800 A1* | 3/2024 | Vahidian | G06N 3/0985 |
| 2024/0086765 A1* | 3/2024 | Lee | G06N 3/045 |
| 2024/0104902 A1* | 3/2024 | Namiki | G06V 10/98 |
| 2024/0135246 A1* | 4/2024 | Miyamoto | G06N 3/006 |
| 2024/0161477 A1* | 5/2024 | Vu | G06V 10/82 |
| 2024/0370735 A1* | 11/2024 | Ohkawa | G06N 3/045 |
| 2024/0404174 A1* | 12/2024 | Li | G06V 10/82 |
| 2025/0014149 A1* | 1/2025 | He | G06V 10/82 |

OTHER PUBLICATIONS

Azusa Sawada et al., "Rough domain adaptation through model selection for neural networks", IEICE Technical Report, Aug. 28, 2019, vol. 119, No. 193, pp. 109-113.

* cited by examiner

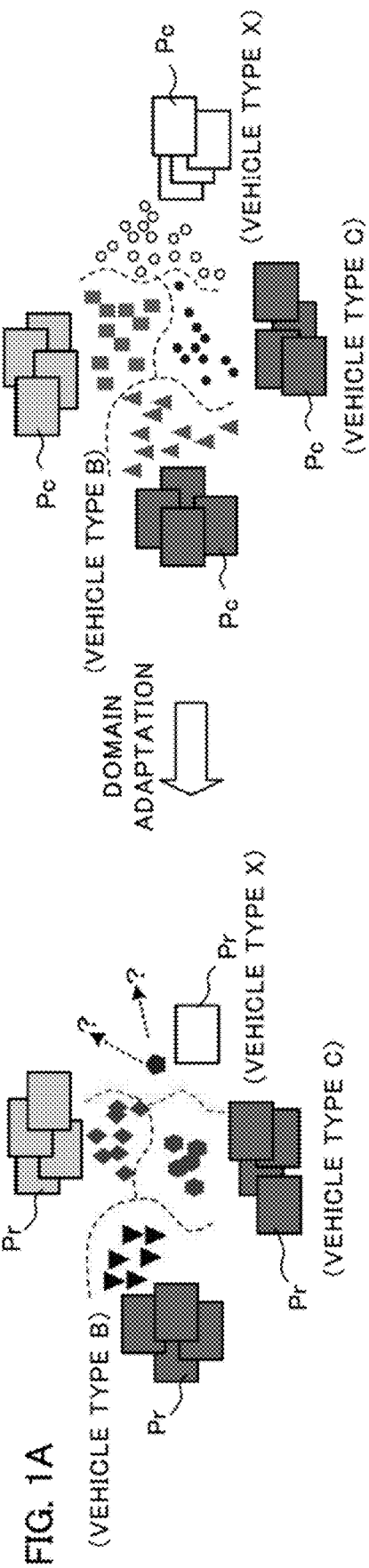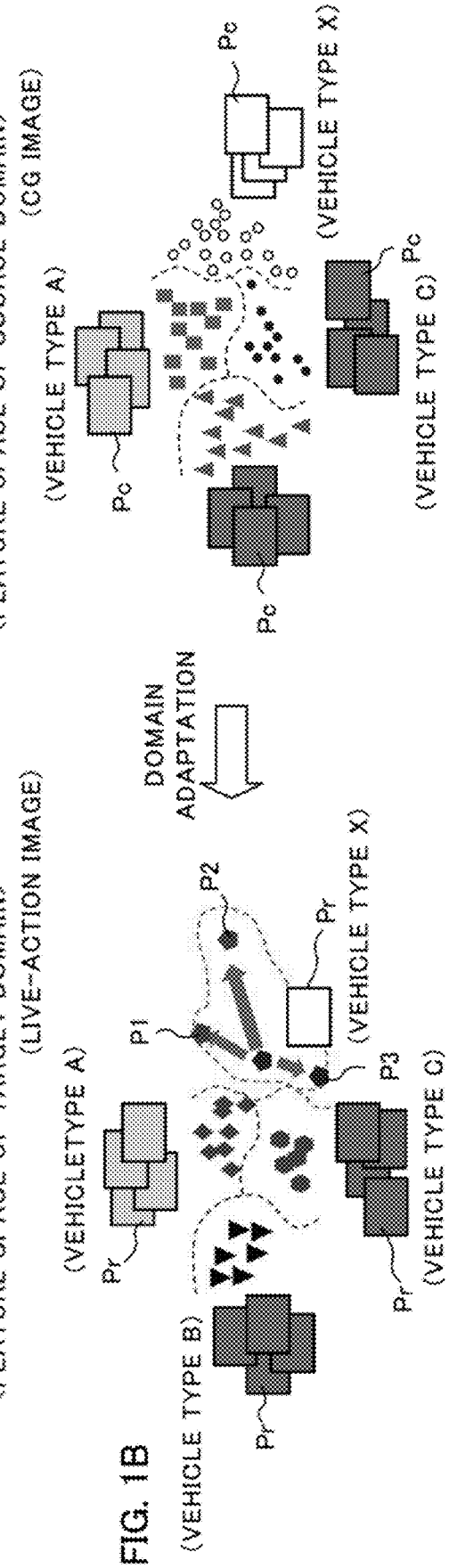

FIG. 2
<FEATURE SPACE OF TARGET DOMAIN>
(VEHICLE TYPE X)
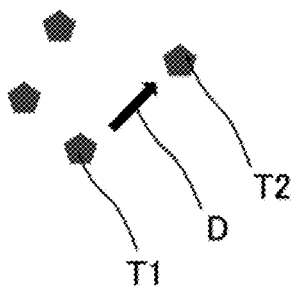
<FEATURE SPACE OF SOURCE DOMAIN>
(VEHICLE TYPE X)
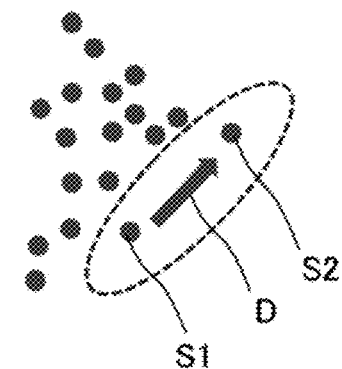

DATA AUGMENTATION DEVICE, LEARNING DEVICE, DATA AUGMENTATION METHOD, AND RECORDING MEDIUM

This application is a National Stage Entry of PCT/JP2020/026348 filed on Jul. 6, 2020, the contents of all of which are incorporated herein by reference, in their entirety.

TECHNICAL FIELD

The present disclosure relates to an augmentation of training data for use in machine learning.

BACKGROUND ART

In a case where a sufficient number of training data sets cannot be obtained in order to train a model of machine learning used for an image recognition or the like, an amount of training data is increased by a data augmentation. Patent Documents 1 and 2 describe examples of a data augmentation method. In addition, Patent Document 3 describes a method for duplicating training data of a particular class to be recognized in a case where an amount of the training data for the particular class is smaller than that of other classes.

PRECEDING TECHNICAL REFERENCES

Patent Document

Patent Document 1: Japanese Laid-open Patent Publication No. 2019-028876
Patent Document 2: Japanese Laid-open Patent Publication No. 2018-106216
Patent Document 3: Japanese Laid-open Patent Publication No. 2013-161298

SUMMARY

Problem to be Solved by the Invention

In general, in a data augmentation of image data, a number of sets of data is increased by deforming an original image data within a limited range in which class labels do not change, by perturbing a hue, a contrast, and the like of each image. Here, in a case where an object for an image recognition or the like is a three-dimensional object, it is preferable to deform an appearance of the object more dynamically by changing an angle of a camera or the like; however, it is difficult to simulate such a dynamic deformation in a technique of perturbing a hue, a contrast, and the like of the image. Therefore, even in a case where the model is trained using augmented data, an effect of improving a performance of the image recognition becomes limited.

In a case where the number of sets of data for some classes is smaller than that for other classes among a plurality of classes to be subjects for the image recognition or the like, the data augmentation is required for those classes.

It is one object of the present disclosure to provide a data augmentation device which increases a number of sets of training data for classes having a small number of sets of data, trains the model, and thus can improve a recognition performance of the model.

Means for Solving the Problem

According to an example aspect of the present disclosure, there is provided a data augmentation device including:

a data acquisition means configured to acquire two sets of source domain data of a predetermined class from a data group of a source domain, and acquire one set of target domain data of the predetermined class from a data group of a target domain;

an estimation means configured to estimate a structure of a manifold representing a data distribution of the source domain by using the two sets of source domain data; and a data generation means configured to generate a set of new data of the target domain by using the one set of target domain data and the structure of the manifold.

According to another example aspect of the present disclosure, there is provided a data augmentation method including:

acquiring two sets of source domain data of a predetermined class from a data group of a source domain, and acquiring one set of target domain data of the predetermined class from a data group of a target domain;

estimating a structure of a manifold representing a data distribution of the source domain by using the two sets of source domain data; and generating a set of new data of the target domain by using the one set of target domain data and the structure of the manifold.

According to a further example aspect of the present disclosure, there is provided a recording medium storing a program, the program causing a computer to perform a process including:

acquiring two sets of source domain data of a predetermined class from a data group of a source domain, and acquiring one set of target domain data of the predetermined class from a data group of a target domain;

estimating a structure of a manifold representing a data distribution of the source domain by using the two sets of source domain data; and generating a set of new data of the target domain by using the one set of target domain data and the structure of the manifold.

Effect of the Invention

According to the present disclosure, it becomes possible to perform training of a model by augmenting the number of sets of training data for a class in which the number of sets of data is small, and to improve a recognition performance of the model.

BRIEF DESCRIPTION OF THE DRAWINGS

FIG. 1A and FIG. 1B are diagrams schematically illustrating methods of a domain adaptation.

FIG. 2 schematically illustrates a data augmentation method of a first example embodiment.

EXAMPLE EMBODIMENTS

Figure 3:
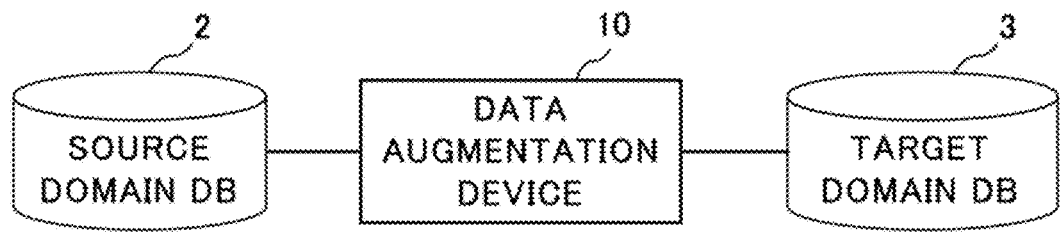
FIG. 3 illustrates the entire configuration of a data augmentation device of the first example embodiment.

In the following, example embodiments will be described with reference to the accompanying drawings.

First Example Embodiment

First, a data augmentation device of a first example embodiment will be described.

[Basic Principles]

A domain adaptation is used as a technique to improve a performance of a model in a case where training data used for training of a machine learning model in a certain area is insufficient. The domain adaptation is a technique to train the model in a target domain in which data are insufficient, by using data of a source domain in which rich data are obtained. In detail, in domain adaptation, data and label information of the source domain are used to train a model to be used in the target domain by making the feature data distributions of the target domain and the source domain match with each other as much as possible. Accordingly, the performance of the model used in the target domain can be improved even in a case where the number of sets of training data in the target domain is insufficient.

However, in a case where there is an imbalance between classes in the number of sets of data in the target domain, the improvement of performance becomes limited even if the domain adaptation is simply used. That is, among the plurality of classes in the target domain, in a case where the number of sets of data for some classes is extremely small compared to other classes, the feature data distribution of the target domain to be generated by the domain adaptation can not be brought close to the feature data distribution of the source domain, and it is thus difficult to sufficiently improve the performance of the model. In the following description, in a case where there is an imbalance between classes in the number of sets of data, a class with an insufficient number of sets of data is called a "minor class", and a class without an insufficient number of sets of data, that is, a class other than the minor class is called a "major class".

As an example, consider a model that recognizes a vehicle type from an image of a vehicle. In this case, a class label to be recognized is the vehicle type. Now, it is assumed that in addition to existing types A to C, a new type X has appeared.

FIG. 1A schematically illustrates an example of simply performing the domain adaptation in a case where there is an imbalance between classes in the target domain. A feature space is a space representing a data distribution of features. In FIG. 1A, the source domain is a domain of a CG (Computer Graphics) image, and a large number of CG images Pc are provided for the vehicle types A to C which differ in the angle of the camera, or the like. A large number of the CG images Pc are prepared for the new vehicle type X in the same manner. Therefore, in the source domain formed by the CG images, in a case where features of the CG images Pc of the respective classes are arranged in the feature space, the feature data distribution as illustrated in the right side in FIG. 1A is obtained.

On the other hand, in a case where the target domain is the domain of real images, there are already many real images Pr for existing vehicle types A to C, but for the new vehicle type X, there are very few real images Pr. Therefore, even in a case where a simple domain adaptation is performed, the feature data distribution in the source domain cannot be simulated in the feature space of the target domain, as illustrated on the left side of FIG. 1A, due to very few real images Pr for the new vehicle type X. Therefore, even in a case where the domain adaptation is simply applied, the improvement of the recognition performance becomes limited.

FIG. 1B schematically illustrates an example of generating a target domain data from source domain data by the domain adaptation of the present example embodiment. In this instance, the feature space of the source domain is the same as that depicted in FIG. 1A, and the feature data distribution of the CG images Pc is illustrated. Here, various variations such as angular variations of a three-dimensional object are reflected in the feature data distribution of the source domain. Therefore, for the new vehicle type X, the feature data distribution of the target domain is generated by simulating the feature data distribution of the source domain. In other words, the feature data distribution of the source domain is transferred to the target domain. In detail, based on the feature data distribution of the source domain, new images P1 to P3 are generated from the real images Pr of the vehicle type X as illustrated on the left side in FIG. 1B. Accordingly, the feature data distribution of the source domain can be transferred to the target domain.

FIG. 2 schematically illustrates a data augmentation method of the first example embodiment. As illustrated on the right side in FIG. 2, in the feature space of the source domain, there is a sufficient number of sets of data for the vehicle type X corresponding to the minor class. Therefore, the data augmentation device randomly picks up two sets of data (sample data) S1 and S2 from a data group of the vehicle type X in the source domain. The data augmentation device then calculates a difference vector D between the two sets of picked-up data S1 and S2.

Next, the data augmentation device randomly picks up one set of data T1 from among the data group of the vehicle type X in the target domain. After that, the data augmentation device adds the difference vector D to the picked-up data T1, and creates a set of new data T2 of the vehicle type X in the target domain. Accordingly, it is possible to add the set of new data to the target domain.

In the above-described example embodiment, the data augmentation device creates the set of new data T2 in the target domain using a difference vector between the two sets of data S1 and S2 in the source domain; however, in addition to the difference vector, the data augmentation device may use a distance defined in the feature space such as a Euclidean distance, a Mahalanobis' distance, or the like.

Since a distribution of a distance between two sets of sample data picked up randomly in the source domain reflects the structure of the manifold of the source domain, by combining with the domain adaptation, it is thought to transfer a structure of a manifold of the source domain to the target domain. Therefore, by the above-described data augmentation method, it is possible to transfer the feature data distribution of the source domain to the feature data distribution of the target domain and to augment the number of sets of data in the target domain.

[Data Augmentation Device]

Next, the data augmentation device of the first example embodiment will be described.

(Overall Configuration)

FIG. 3 illustrates an overall configuration of the data augmentation device of the first example embodiment. The data augmentation device 10 is connected to the source domain database (hereinafter, the "database" is referred to as a "DB") 2 and the target domain DB 3. The source domain DB 2 stores a source domain data group including sets of training data of the source domain. The target domain DB 3 stores sets of target domain data which are sets of training data of the target domain. The training data are data used for training of a machine learning model for performing the image recognition or the like, and include sets of learning image data and correct answer labels (training labels) respective to the sets of the learning image data.

The data augmentation device 10 creates training data of the minor class of the target domain. In detail, the data augmentation device 10 acquires the source domain data from the source domain DB 2 and also acquires the target domain data from the target domain DB 3. The data augmentation device 10 creates new target domain data using the source domain data and the target domain data, and stores the new target domain data in the target domain DB 3. Accordingly, the number of sets of the target domain data for the minor class is augmented.

(Hardware Configuration)

Figure 4:
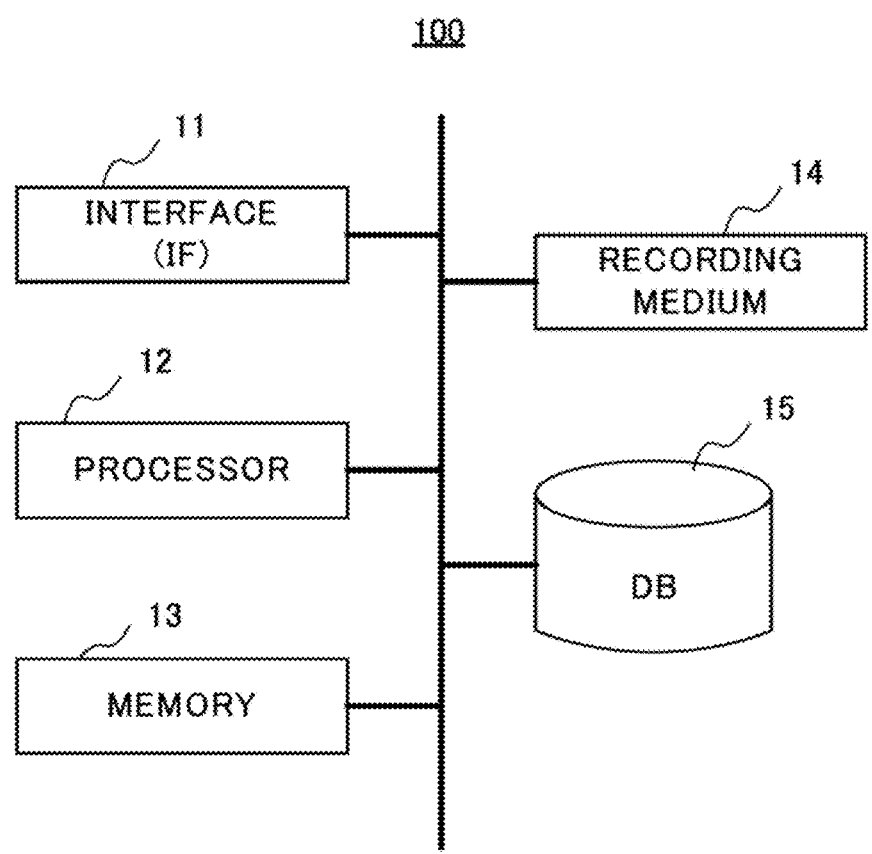
FIG. 4 is a block diagram illustrating a hardware configuration of the data augmentation device.

FIG. 4 is a block diagram illustrating a hardware configuration of the data augmentation device 10. As illustrated, the data augmentation device 10 includes an interface (hereinafter referred to as an "IF") 11, a processor 12, a memory 13, a recording medium 14, and a database (DB) 15).

The IF 11 inputs and outputs data to and from an external device. Specifically, the data stored in the source domain DB 2 and the target domain DB 3 are input to the data augmentation device 10 through the IF 11. A set of new data generated by the data augmentation device 10 is stored in the target domain DB 3 through the IF 11.

The processor 12 corresponds to one or more processors each being a computer such as a CPU (Central Processing Unit) and a GPU (Graphics Processing Unit), and controls the entire of the data augmentation device 10 by executing programs prepared in advance. Specifically, the processor 12 executes a data augmentation process which will be described later.

The memory 13 is formed by a ROM (Read Only Memory) and a RAM (Random Access Memory). The memory 13 is also used as a working memory during various processes being executed by the processor 12.

The recording medium 14 is a non-volatile and non-transitory recording medium such as a disk-like recording medium, a semiconductor memory, or the like, and is detachably formed with respect to the data augmentation device 10. The recording medium 14 records various programs executed by the processor 12. When the data augmentation device 10 executes various processes, the programs recorded on the recording medium 14 are loaded into the memory 13 and executed by the processor 12.

The database 15 temporarily stores data entered through IF 11 from the source domain DB 2 or the target domain DB 3. The data augmentation device 10 may include an input section such as a keyboard, a mouse, or the like, and a display section such as a liquid crystal display to allow a user to give instructions or input.

(Function Configuration)

Figure 5:
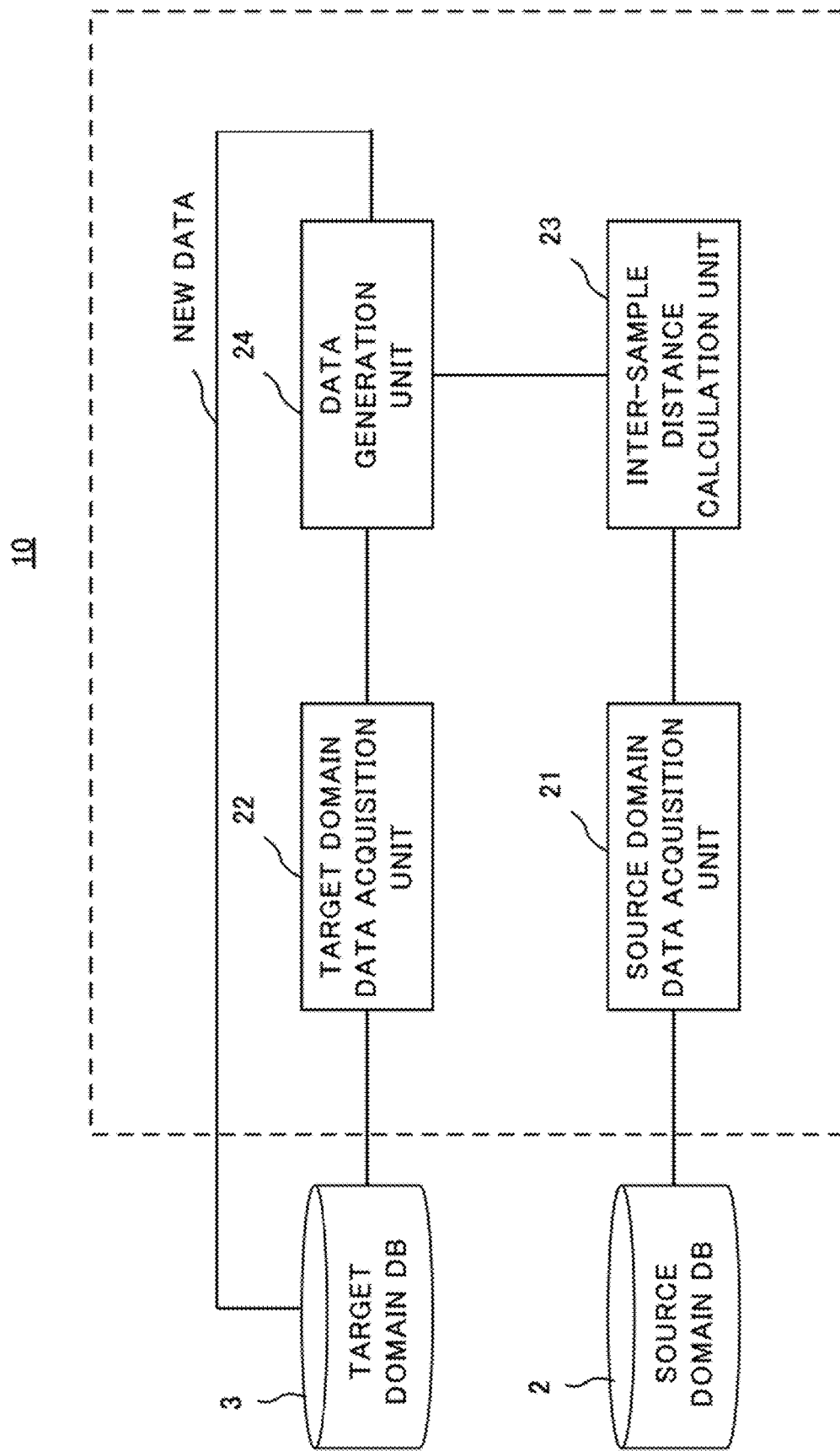
FIG. 5 is a block diagram illustrating a functional configuration of the data augmentation device.

FIG. 5 is a block diagram illustrating a functional configuration of the data augmentation device 10. As illustrated in FIG. 5, the data augmentation device 10 includes a source domain data acquisition unit 21, a target domain data acquisition unit 22, an inter-sample distance calculation unit 23, and a data generation unit 24.

The source domain data acquisition unit 21 randomly acquires two sets of sample data from the source domain DB 2 for the minor class to be a subject for the data augmentation, and outputs acquired sample data to the inter-sample distance calculation unit 23. The inter-sample distance calculation unit 23 calculates a distance (hereinafter, also referred to as a "sample distance".) between the two sets of sample data in the feature space, and outputs the calculated distance to the data generation unit 24. As described above, as the sample distance, it is possible to use the distance such as the difference vector, the Euclidean distance, or the Mahalanobis' distance.

The target domain data acquisition unit 22 randomly acquires one set of sample data of the minor class described above from the target domain DB 3, and outputs the acquired sample data to the data generation unit 24. The data generation unit 24 generates a set of new data of the target domain by using one set of sample data of the target domain input from the target domain data acquisition unit 22 and the inter-sample distance input from the inter-sample distance calculation unit 23, generates the set of new data of the target domain, and outputs a set of the generated new data to the target domain DB 3. In detail, as illustrated in FIG. 2, the data generation unit 24 generates the set of new data T2 in the target domain based on one sample data T1 of the target domain and an inter-sample distance such as the difference vector D. Accordingly, sets of data in the source domain and sets of data in the target domain are used to generate a set of new data for the target domain.

In the above example, the target domain data acquisition unit 22 acquires any one set of sample data of a specific minor class in the target domain; however, instead, representative data in a plurality of sets of data of the specific minor class may be acquired in the target domain. In this case, the representative data can be data corresponding to an average value, a median value, a center of gravity, and the like of the plurality of sets of data of the minor class. In other words, the target domain data acquisition unit 22 acquires, as one set of sample data, data that do not deviate significantly from the feature data distribution formed by a plurality of sets of data of the minor class. Accordingly, it is possible to appropriately transfer the structure of the manifold of the source domain to the target domain.

In the above configuration, the source domain data acquisition unit 21 and the target domain data acquisition unit 22 correspond to examples of a data acquisition means, the inter-sample distance calculation unit 23 corresponds to an example of an estimation means, and the data generation unit 24 corresponds to an example of a data generation means.

(Data Augmentation Process)

Figure 6:
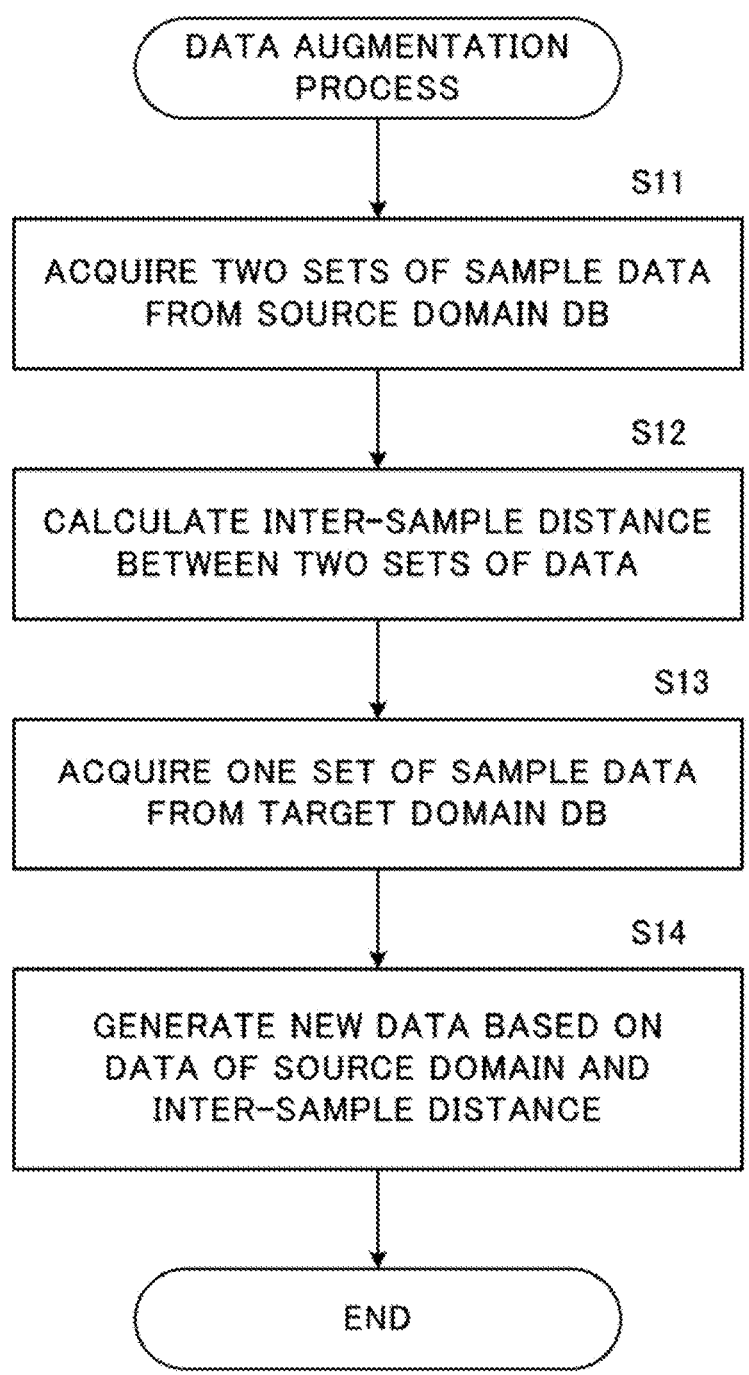
FIG. 6 is a flowchart of the data augmentation process according to the first example embodiment.

FIG. 6 is a flowchart of the data augmentation process according to the first example embodiment. This process is realized by the processor 12 depicted in FIG. 4, which executes a program prepared in advance and operates as each element depicted in FIG. 5.

First, the source domain data acquisition unit 21 acquires any two sets of sample data from the source domain DB 2 (step S11). Next, the inter-sample distance calculation unit 23 calculates the inter-sample distance between the two sets of sample data (step S12). After that, the target domain data acquisition unit 22 acquires one set of sample data from the target domain DB 3 (step S13). Note that, as described above, this one set of sample data may be used as any one set of data, or may be used as the representative data in the plurality of sets of data of the minor class to be subjects for the data augmentation.

Next, the data generation unit 24 generates a set of new data of the target domain using the inter-sample distance calculated in step S12 and one set of sample data of the target domain acquired in step S13 (step S14). After that, the data augmentation process is terminated. The data augmentation device 10 repeatedly performs the above-described data augmentation process until the necessary number of sets of data are obtained.

As described above, according to the data augmentation device 10 of the first example embodiment, for the minor class where the number of sets of data is insufficient, it is possible to augment the number of sets of data in the target domain by transferring the structure of the manifold of the source domain to the target domain. Therefore, even in a case where there exists an imbalance between classes in the number of sets of target domain data, it is possible to properly augment the number of sets of data.

Second Example Embodiment

In a second example embodiment, the data augmentation device according to the first example embodiment is applied to a learning device of an image recognition model. In other words, the learning device performs training of the image recognition model while augmenting the number of sets of training data for the minor class.

[Functional Configuration]

Figure 7:
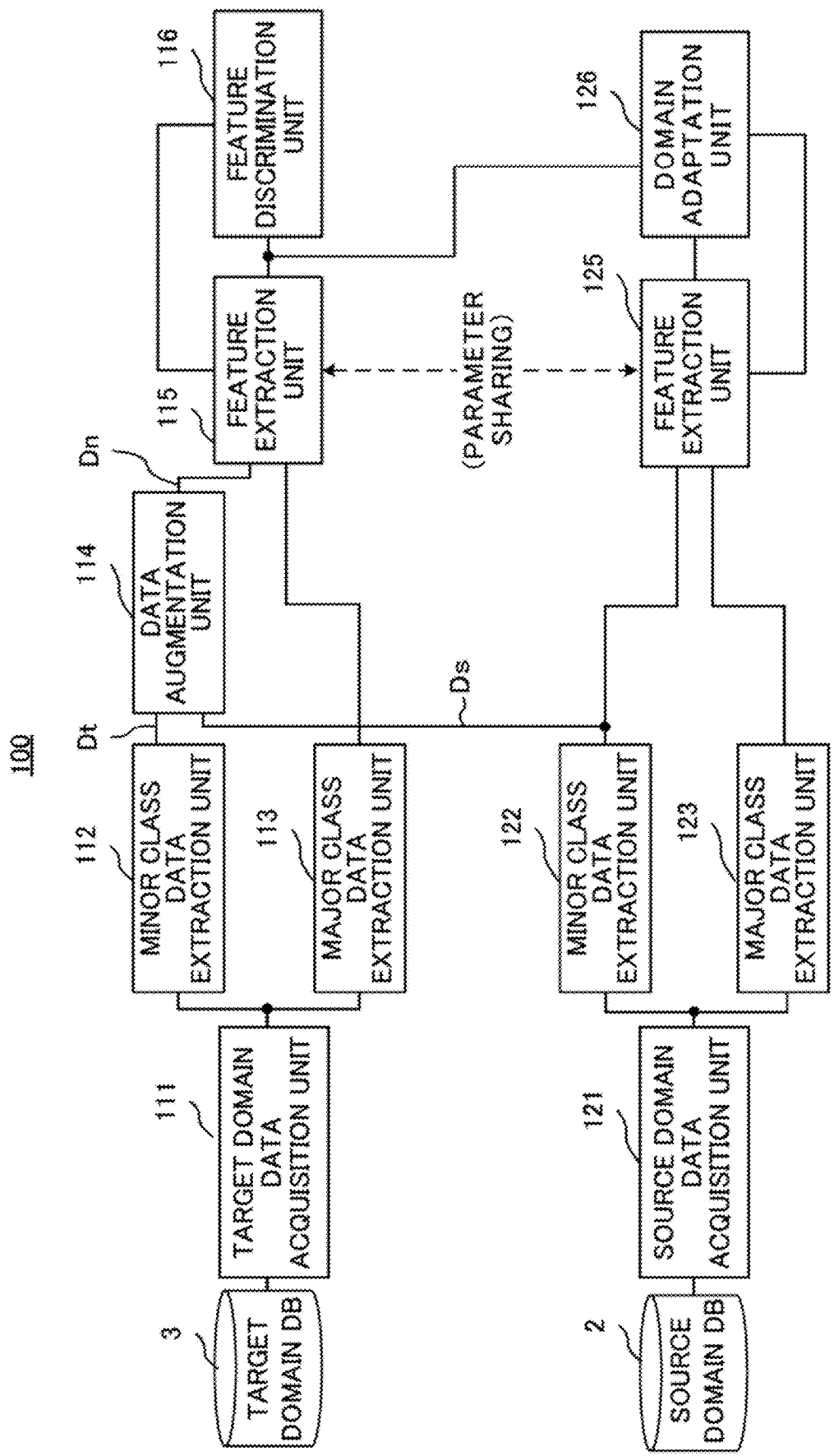
FIG. 7 is a block diagram illustrating a functional configuration of a learning device according to a second example embodiment.

FIG. 7 is a block diagram illustrating a functional configuration of a learning device according to the second example embodiment. A hardware configuration of the learning device according to the second example embodiment is basically the same as that of the first example embodiment depicted in FIG. 4. As illustrated, a learning device 100 includes a target domain data acquisition unit 111, a minor class data extraction unit 112, a major class data extraction unit 113, a data augmentation unit 114, a feature extraction unit 115, a feature discrimination unit 116, a source domain data acquisition unit 121, a minor class data extraction unit 122, a major class data extraction unit 123, a feature extraction unit 125, and a domain adaptation unit 126. In this configuration, the data augmentation unit 114 performs data augmentation using the target domain data and the source domain data for the minor class in the same manner as in the first example embodiment.

The target domain data acquisition unit 111 acquires the target domain data from the target domain DB 3, and outputs the acquired target domain data to the minor class data extraction unit 112 and the major class data extraction unit 113. The minor class data extraction unit 112 extracts the target domain data Dt of a predetermined minor class from the target domain data, and outputs the target domain data Dt to the data augmentation unit 114. The major class data extraction unit 113 extracts data of the major class, that is, data of classes other than the minor class from the target domain data, and outputs the extracted data to the feature extraction unit 115.

On the other hand, the source domain data acquisition unit 121 acquires the source domain data from the source domain DB 2, and outputs the acquired source domain data to the minor class data extraction unit 122 and the major class data extraction unit 123. The minor class data extraction unit 122 extracts a predetermined minor class of the source domain data Ds from the source domain data, and outputs the extracted predetermined minor class to the data augmentation unit 114 and the feature extraction unit 125. Note that there are a plurality of predetermined minor classes, the minor class data extraction unit 112 and the minor class data extraction unit 122 extracts data of the same minor class.

Figure 8:
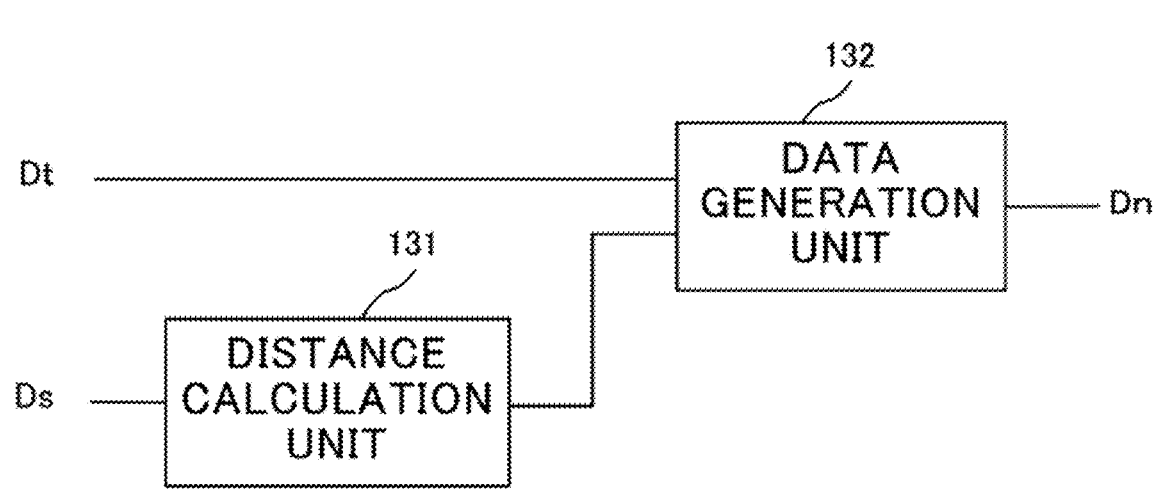
FIG. 8 is a block diagram illustrating a configuration of a data augmentation unit.

The data augmentation unit 114 performs the data augmentation for the minor class. FIG. 8 is a block diagram illustrating a configuration of the data augmentation unit 114. The data augmentation unit 114 includes a distance calculation unit 131 and a data generation unit 132. The two sets of sample data of the source domain data Ds extracted randomly by the minor class data extraction unit 122 are input to the distance calculation unit 131. The distance calculation unit 131 calculates a distance between the two sets of sample data being input, and outputs the calculated distance to the data generation unit 132. The distance here may be the difference vector, the Euclidean distance, or another distance as previously described.

One set of sample data of the target domain data Dt is input from the minor class data extraction unit 112 to the data generation unit 132. The data generation unit 132 generates the new target domain data Dn in accordance with the method schematically depicted in FIG. 2 by using one set of sample data of the target domain data Dt and the distance calculated by the distance calculation unit 131, and outputs the new target domain data Dn to the feature extraction unit 115. Accordingly, it is possible to augment the number of sets of the target domain data in the minor class, and to use the target domain data as the training data for learning. In the training data, the new target domain data Dn are used as the learning image data, and a class label of the predetermined minor class described above is used as the correct answer label.

The feature extraction unit 115 performs a feature extraction for each of the target domain data of the minor class input from the data augmentation unit 114 and the target domain data of the major class input from the major class data extraction unit 113, and outputs the extracted features to the feature discrimination unit 116 and the domain adaptation unit 126. The feature extraction unit 115 is formed by a neural network such as a CNN (Convolutional Neural Network), for instance. The feature discrimination unit 116 performs a class discrimination for each target domain data based on the extracted features, and calculates an error by comparing a discrimination result with the correct answer label corresponding to the data. After that, the feature discrimination unit 116 updates parameters of the neural network forming the feature extraction unit 115 so as to minimize the calculated error.

On the other hand, the feature extraction unit 125 performs the feature extraction for respective sets of the source domain data for the minor class which are input from the minor class data extraction unit 122 and for respective sets of the source domain data for the major class which are input from the major class data extraction unit 123, and outputs the extracted features to the domain adaptation unit 126. The feature extraction unit 125 is formed by a neural network having the same configuration as that of the feature extraction unit 115, and the same parameters as those of the feature extraction unit 115 are set. That is, the feature extraction unit 115 and the feature extraction unit 125 share the same parameters.

The domain adaptation unit 126 optimizes the parameters of the neural network forming the feature extraction unit 125 so as to make the feature data distributions of the data derived from the two domains to be closer based on the features of respective sets of domain data input from the feature extraction units 115 and 125. The optimized parameters are shared with the feature extraction unit 115. Therefore, the parameters of the feature extraction units 115 and 125 are optimized so that the class classification by the feature discrimination unit 116 is correctly performed and the feature data distributions of sets of data in the two domains are to be closer. After that, the learning by the learning device 100 is completed when a predetermined learning end condition is satisfied, and the parameters of the feature extraction unit 115 at that time are obtained as the parameters of the learning image recognition model.

As described above, in the learning device 100 of the second example embodiment, for the minor class in which the number of sets of data for the target domain is insufficient, it is possible to train the image recognition model by generating a set of new data using the source domain data and the target domain data. For instance, in the above-described example, in a case where there is a shortage of real images of a new vehicle type, the necessary number of CG images is prepared for the vehicle type, and the image recognition model can be trained while supplementing the shortage of the real images using a small number of real images and the CG images. Accordingly, even in a case where it is difficult to acquire the real images for the new vehicle type, it is possible to train the image recognition model so as to recognize the vehicle type with an accuracy required for practical use.

As illustrated in FIG. 7, in the learning device 100 according to the second example embodiment, the data augmentation unit 114 is arranged at a front stage of the feature extraction unit 115, and generates a set of new data at a stage of image data. Therefore, as in the third example embodiment to be described later, the stage after extracting the features from the image data, that is, as compared with a case of performing the data augmentation at a stage of the feature data, it is possible to reduce a load of calculations.

In the above-described configuration, the data augmentation unit 114 corresponds to an example of a data augmentation device, the feature discrimination unit 116 corresponds to an example of a discrimination means, the feature discrimination unit 116 and the domain adaptation unit 126 correspond to an example of a learning means.

[Learning Process]

Figure 9:
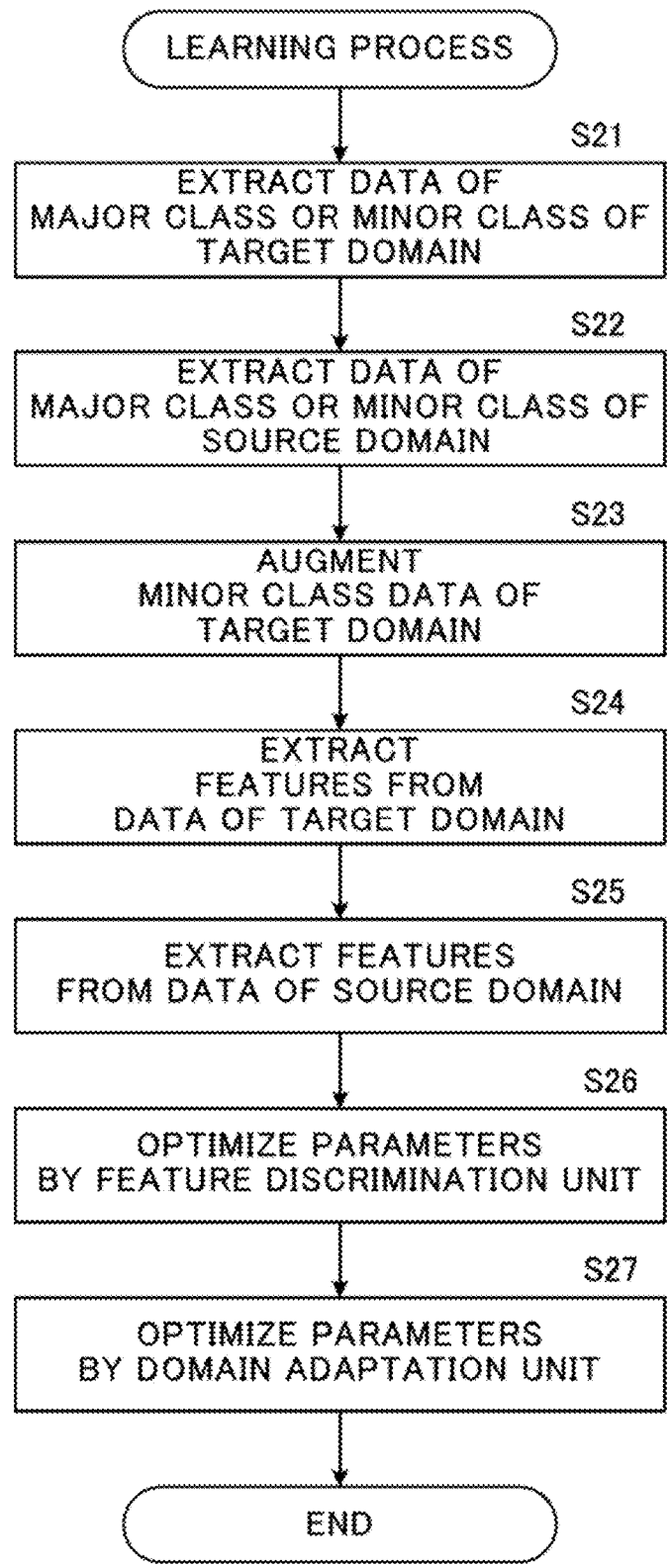
FIG. 9 is a flowchart of a learning process according to the second example embodiment.

FIG. 9 is a flowchart of a learning process according to a second example embodiment. This process is realized by the processor 12 depicted in FIG. 4, which executes a program prepared in advance and operates as each element depicted in FIG. 7.

First, the target domain data acquisition unit 111 acquires the target domain data from the target domain DB 3. The minor class data extraction unit 112 extracts the minor class data from the target domain data, and the major class data extraction unit 113 extracts the major class data from the target domain data (step S21).

The source domain data acquisition unit 121 acquires the source domain data from the source domain DB 2. The minor class data extraction unit 122 extracts the minor class data from the source domain data, and the major class data extraction unit 123 extracts the major class data from the source domain data (step S22).

Next, the data augmentation unit 114 generates new target domain data Dn using the target domain data Dt of the minor class and the source domain data Ds of the minor class (step S23).

Next, the feature extraction unit 115 performs the feature extraction from the major class data of the target domain and the set of new data generated by the data augmentation unit 114 (step S24). Also, the feature extraction unit 125 performs the feature extraction from the minor class data and the major class data of the source domain (step S25).

Next, the feature discrimination unit 116 performs the class classification with respect to the image data using the features extracted by the feature extraction unit 115 and optimizes the parameters of the neural network forming the feature extraction unit 115 using a classification result (step S26). In detail, the feature discrimination unit 116 updates the parameters of the neural network forming the feature extraction unit 115 based on an error between a classification result and the correct answer label.

Moreover, the domain adaptation unit 126 optimizes the parameters of the neural network forming the feature extraction unit 125 so that the feature data distributions of image data derived from two domains are approximated by using the features which are extracted by the feature extraction units 115 and 125 (step S27). In detail, the domain adaptation unit 126 updates the parameters of the neural network forming the feature extraction unit 125 so as to minimize a distance between the feature data distribution of the source domain data and the feature data distribution of the target domain data.

The learning device 100 performs the above-described process until a predetermined learning end condition is provided. The learned image recognition model is formed by the parameters set in the feature extraction units 115 and 125 at a time of an end of the learning.

Modification 1

In the above example embodiment, the data generation unit 132 generates a new target domain data Dn using one target domain data Dt and the distance output from the distance calculation unit 131. At this time, the data generation unit 132 may generate the new target domain data Dn by multiplying a predetermined weight to the distance output from the distance calculation unit 131. For instance, a value of a weight is set in a range from 0 to 1, and the data generation unit 132 performs training of the model by setting a small value to be the value of the weight in an initial stage of the learning by the learning device 100. After that, the data generation unit 132 may refer to the error of the class classification to be calculated by the feature discrimination unit 116 and the distance between feature data distributions derived from the two domains, and may adjust the feature data distribution of the data to be augmented by gradually increasing the value of the weight while these values are in a direction of convergence and decreasing the value of the weight while these values are not in the direction of convergence.

Third Example Embodiment

In the above-described second example embodiment, the learning device 100 performs the data augmentation at the stage of the image data. In contrast, in the third example embodiment described below, the learning device performs the data augmentation at a stage of the feature data.

[Function Configuration]

Figure 10:
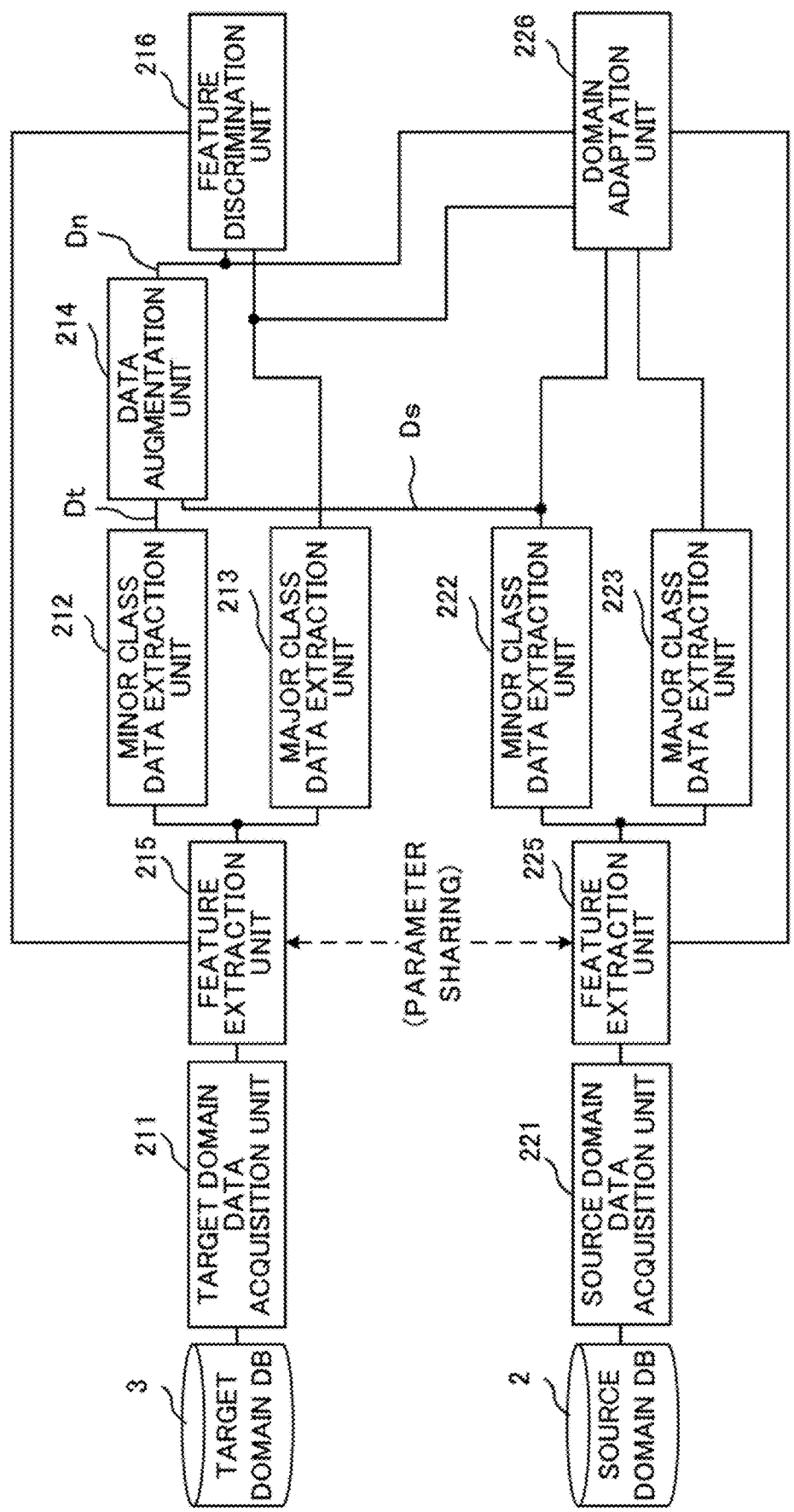
FIG. 10 is a block diagram illustrating a functional configuration of a learning device according to a third example embodiment.

FIG. 10 is a block diagram illustrating a functional configuration of the learning device according to a third example embodiment. The hardware configuration of the learning device according to the third example embodiment is basically the same as that of the first example embodiment depicted in FIG. 4. As illustrated, the learning device 200 includes a target domain data acquisition unit 211, a minor class data extraction unit 212, a major class data extraction unit 213, a data augmentation unit 214, a feature extraction unit 215, a feature discrimination unit 216, a source domain data acquisition unit 221, a minor class data extraction unit 222, a major class data extraction unit 223, a feature extraction unit 225, and a domain adaptation unit 226.

As can be understood from a comparison with FIG. 7, in the third example embodiment, the feature extraction unit 215 is arranged in a front of the minor class data extraction unit 212 and the major class data extraction unit 213, and the feature extraction unit 225 is arranged in a front of the minor class data extraction unit 222 and the major class data extraction unit 223. By these arrangements, the data augmentation unit 214 performs the data augmentation using the feature data extracted by the feature extraction units 215 and 225. Other than these points, the process of the learning device 200 according to the third example embodiment is basically the same as that according to the second example embodiment.

In detail, the feature extraction unit 215 extracts features from the target domain data acquired by the target domain data acquisition unit 211, and outputs the extracted features to the minor class data extraction unit 212 and the major class data extraction unit 213. The minor class data extraction unit 212 extracts the minor class data from the target domain data, and outputs the extracted data to the data augmentation unit 214. The major class data extraction unit 213 extracts the major class data from the target domain data, and outputs the extracted data to the feature discrimination unit 216 and the domain adaptation unit 226.

The feature extraction unit 225 extracts features from the source domain data acquired by the source domain data acquisition unit 221, and outputs the extracted features to the minor class data extraction unit 222 and the major class data extraction unit 223. The minor class data extraction unit 222 extracts the minor class data Ds from the source domain data, and outputs the minor class data Ds to the data augmentation unit 214 and the domain adaptation unit 226. The major class data extraction unit 223 extracts the major class data from the source domain data, and outputs the major class data to the domain adaptation unit 226.

The data augmentation unit 214 performs the data augmentation using one set of sample data in the target domain data Dt as the feature data and two sets of sample data in the source domain data Ds as the feature data. The structure of the data augmentation unit 214 is similar to the data augmentation unit 114 of the second example embodiment depicted in FIG. 8. However, in the third example embodiment, the distance calculation unit 131 calculates a distance between the two sets of sample data in the source domain data Ds as features, and the data generation unit 132 generates the new target domain data Dn using the distance. The data augmentation unit 214 outputs the generated new target domain data Dn to the feature discrimination unit 216.

The feature discrimination unit 216 performs the class discriminations respectively to the target domain data of the minor class generated by the data augmentation unit 214 and the target domain data of the major class extracted by the major class data extraction unit 213, and calculates an error by comparing the discrimination result with the correct answer label corresponding to the data. After that, the feature discrimination unit 216 updates the parameters of the feature extraction unit 215 so that the calculated error is reduced.

On the other hand, the domain adaptation unit 226 optimizes the parameters of the feature extraction unit 225 so as to reduce the distance between the feature data distribution of the source domain data input from the data augmentation unit 214 or the major class data extraction unit 213 and the feature data distribution of the source domain data input from the minor class data extraction unit 222 or the major class data extraction unit 223. The optimized parameters are shared with the feature extraction unit 215. Therefore, the parameters of the feature extraction units 215 and 225 are optimized so that the class classification by the feature discrimination unit 216 is correctly performed and the feature data distributions of data of the two domains are approached to each other. Accordingly, the learning by the learning device 200 is terminated when the predetermined reference is satisfied, and the parameters of the feature extraction units 215 and 225 at that time are obtained as the parameters of the trained image recognition model.

As described above, even by the learning device 200 of the third example embodiment, for the minor class in which the number of sets of data for the target domain is insufficient, it is possible to train the image recognition model by generating a set of new data using the source domain data and the target domain data.

In the above-described configuration, the data augmentation unit 214 corresponds to an example of a data augmentation device, the feature discrimination unit 216 corresponds to an example of a discrimination means, the feature discrimination unit 216 and the domain adaptation unit 226 correspond to an example of the learning means.

[Learning Process]

Figure 11:
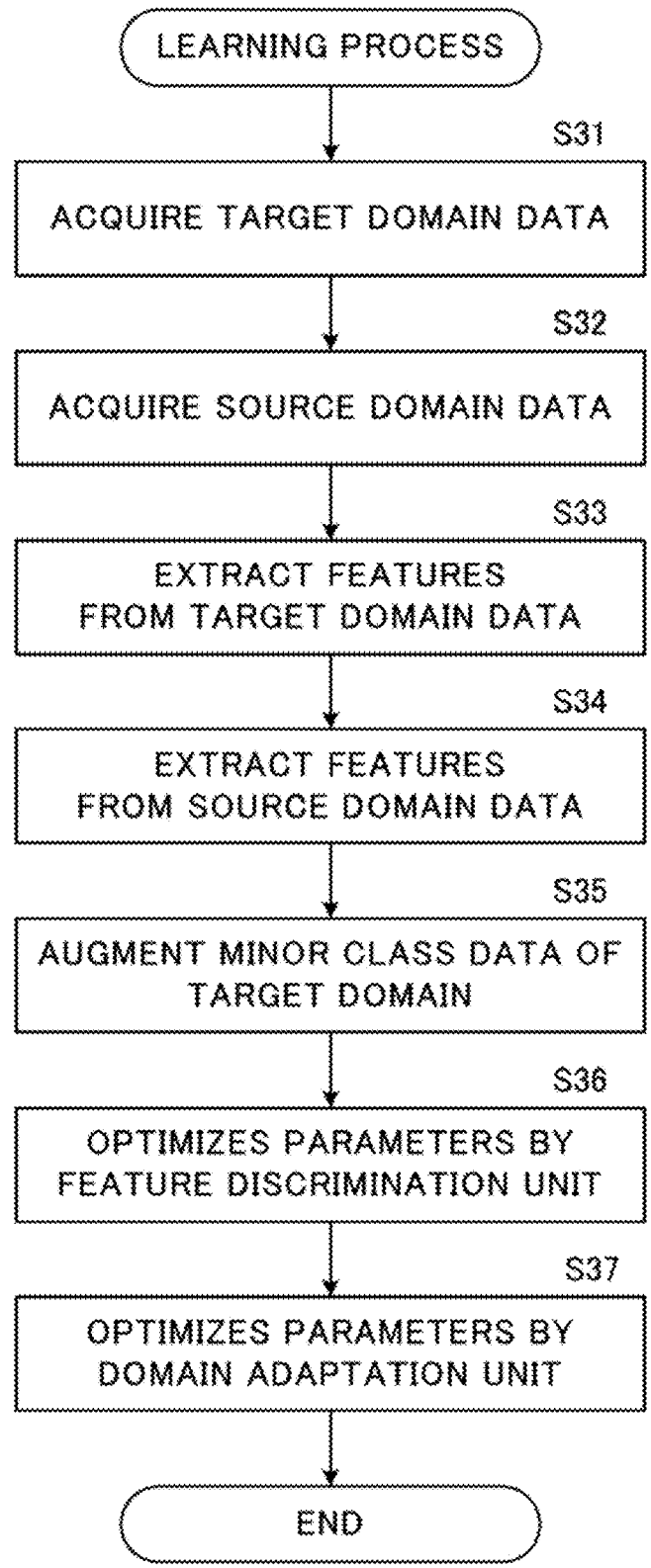
FIG. 11 is a flowchart of a learning process according to the third example embodiment.

FIG. 11 is a flowchart of a learning process according to a third example embodiment. This learning process is realized by the processor 12 depicted in FIG. 4, which executes a program prepared in advance and operates as each element depicted in FIG. 10.

First, the target domain data acquisition unit 211 acquires the target domain data from the target domain DB 3 (step S31). Also, the source domain data acquisition unit 221 acquires the source domain data from the source domain DB 2 (step S32).

Next, the feature extraction unit 215 performs the feature extraction from the target domain data, and outputs the target domain data as the feature data to the minor class data extraction unit 212 and the major class data extraction unit 213 (step S33). Moreover, the feature extraction unit 225 performs the feature extraction from the source domain data, and outputs the source domain data as the feature data to the minor class data extraction unit 222 and the major class data extraction unit 223 (step S34).

Next, the data augmentation unit 214 generates the new target domain data Dn using the target domain data Dt of the minor class and the source domain data Ds of the minor class (step S35). In this case, the data augmentation unit 214 generates the new target domain data Dn as the feature data by using the target domain data and the source domain data which are the feature data.

Next, the feature discrimination unit 216 performs the class classification of the image data using the new target domain data Dn generated by the data augmentation unit 214 and the target domain data as the feature data output from the measure class data extraction unit 213, and optimizes the parameters of the neural network forming the feature extraction unit 215 using the classification result (step S36).

Moreover, the domain adaptation unit 226 optimizes the parameters of the neural network forming the feature extraction unit 225 so that the feature data distributions of the image data derived from the two domains are approximated, by using the target domain data as the feature data output from the data augmentation unit 214 or the major class data extraction unit 213 and the source domain data as the feature data output from the minor class data extraction unit 222 or the major class data extraction unit 223 (step S37).

The learning device 200 performs the above-described process until a predetermined learning end condition is provided. The learned feature extraction model is formed by the parameters which are set in the feature extraction units 215 and 225 at a time when the learning is terminated.

Modifications

Modification 1 in the second example embodiment can also be applied to the third example embodiment. That is, even in the third example embodiment, the data generation unit 132 of the data augmentation unit 214 may generate the new target domain data Dn by multiplying a predetermined weight to the distance output from the distance calculation unit 131.

Fourth Example Embodiment

Figure 12:
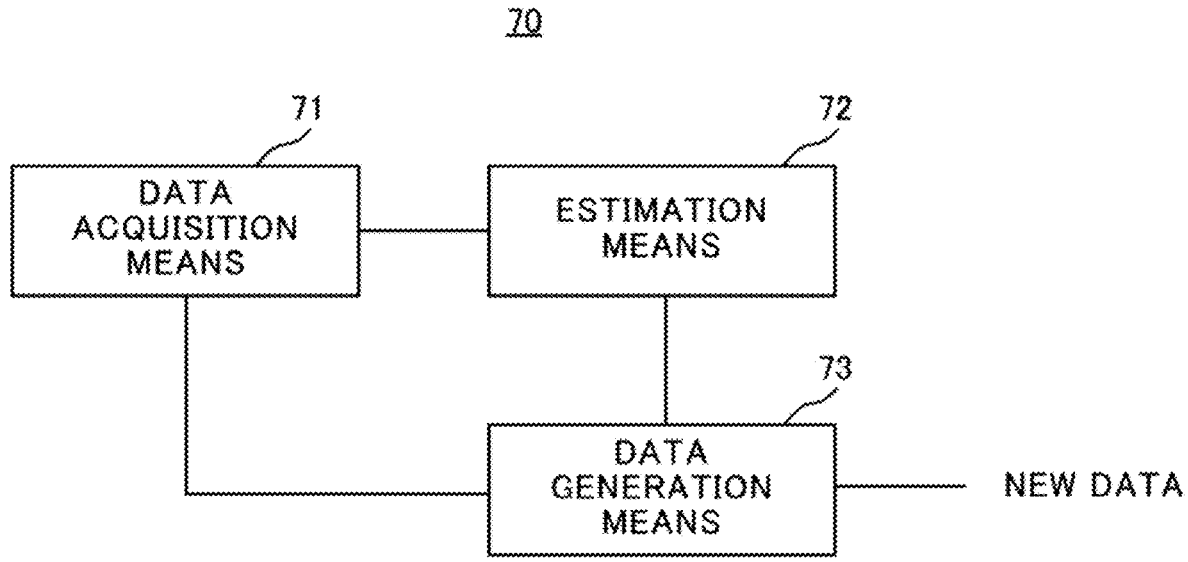
FIG. 12 is a block diagram illustrating a functional configuration of a data augmentation device according to a fourth example embodiment.

Next, a fourth example embodiment of the present invention will be described. FIG. 12 is a block diagram illustrating a functional configuration of a data augmentation device 70 according to the fourth example embodiment. The data augmentation device 70 includes a data acquisition means 71, an estimation unit 72, and a data generation means 73.

The data acquisition means 71 acquires two sets of the source domain data of a predetermined class from the data group of the source domain, and acquires one set of the target domain data of a predetermined class from the data group of the target domain. The estimation means 72 estimates a structure of the manifold which indicates the data distribution of the source domain using the two sets of the source domain data. The data generation means 73 generates a set of new data of the target domain using one set of the target domain data and the structure of the manifold.

Figure 13:
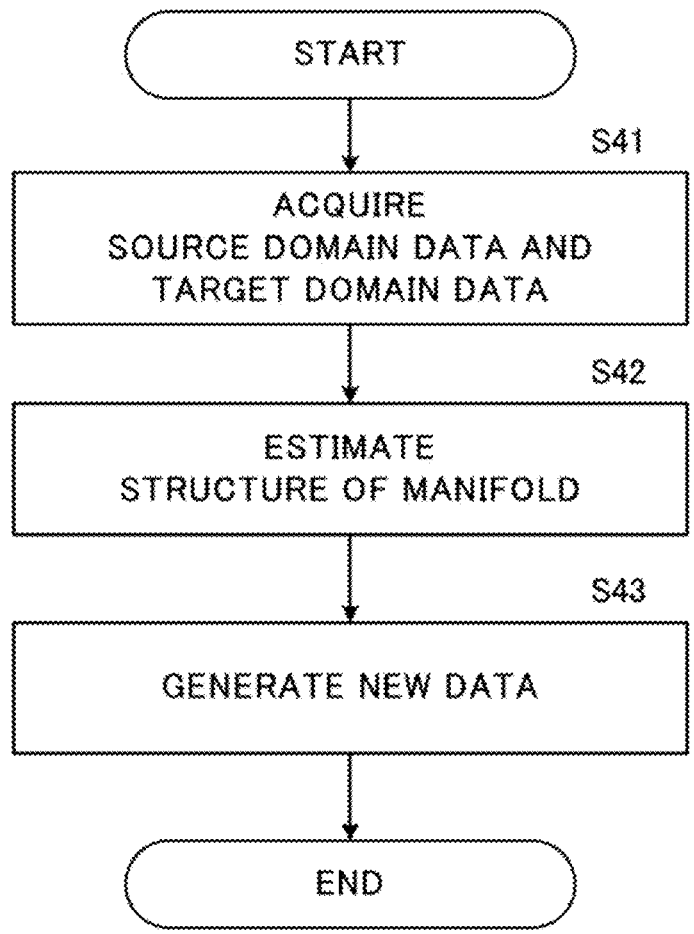
FIG. 13 is a flowchart of a data augmentation process according to the fourth example embodiment.

FIG. 13 is a flowchart of the data augmentation process according to the fourth example embodiment. This data augmentation process is performed by the data augmentation device 70 depicted in FIG. 12. In detail, the data acquisition means 71 acquires two sets of the source domain data of the predetermined class from the data group of the source domain, and acquires one set of the target domain data of the predetermined class from the data group of the target domain (step S41). The estimation means 72 estimates the structure of the manifold indicating the data distribution of the source domain using the two sets of the source domain data (step S42). The data generation means 73 generates a set of new data of the target domain using one set of the target domain data and the structure of the manifold (step S43).

Application Example

The above-described example embodiments can be preferably applied in a system for performing the image recognition or the like, when a new class different from the conventional class appears. For instance, it is possible to apply the example embodiments in a case where a new vehicle type has appeared in a surveillance camera system for vehicles or the like, or a case where a new object to be inspected (that is, a new product) has appeared in an appearance inspection system such as a manufacturing line in a factory.

Note that not only a case where a new class that has never existed before appears but also a case where an object of the same class as the conventional one viewed from a different direction is used as another new class, the above example embodiment can be used. For instance, in the surveillance camera system for the vehicle or the like, the vehicle type has been conventionally recognized by using images taken from a front of the vehicle (hereinafter, referred to as "front images"); however, here assume that the system is improved so that the vehicle type is recognized additionally using images taken from a rear of the vehicle (hereinafter referred to as "rear images"). Here, even in a case where there is an imbalance of the number of sets of data between classes for the rear images, that is, the number of sets of data of the rear images is extremely insufficient for a certain vehicle type, any one of methods of the above example embodiments can be applied.

A part or all of the example embodiments described above may also be described as the following supplementary notes, but not limited thereto.

(Supplementary Note 1)

1. A data augmentation device comprising:
   a data acquisition means configured to acquire two sets of source domain data of a predetermined class from a data group of a source domain, and acquire one set of target domain data of the predetermined class from a data group of a target domain;
   an estimation means configured to estimate a structure of a manifold representing a data distribution of the source domain by using the two sets of source domain data; and
   a data generation means configured to generate a set of new data of the target domain by using the one set of target domain data and the structure of the manifold.

(Supplementary Note 2)

2. The data augmentation device according to supplementary note 1, wherein the estimation means estimates the structure of the manifold based on a distance between features of the two sets of source domain data.

(Supplementary Note 3)

3. The data augmentation device according to supplementary note 2, wherein the data generation means generates, as the set of new data, a set of data having the distance from one set of target domain data in the data distribution of the target domain.

(Supplementary Note 4)

4. The data augmentation device according to supplementary note 2 or 3, wherein the data generation means generates the set of new data by weighing the distance.

(Supplementary Note 5)

5. The data augmentation device according to any one of supplementary notes 1 to 4, wherein the data acquisition means randomly acquires the one set of target domain data from the data group of the target domain.

(Supplementary Note 6)

6. The data augmentation device according to any one of supplementary notes 1 to 4, wherein the data acquisition means acquires, as the one set of target domain data, a set of data corresponding to a representative value of features of the data group of the target domain.

(Supplementary Note 7)

7. The data augmentation device according to any one of supplementary notes 1 to 6, wherein the data acquisition means acquires the two sets of source domain data from the data group of the source domain.

(Supplementary Note 8)

8. The data augmentation device according to any one of supplementary notes 1 to 7, wherein the predetermined class corresponds to a class in which the number of sets of data in the target domain is equal to or greater than a predetermined number.

(Supplementary Note 9)

9. The data augmentation device according to any one of supplementary notes 1 to 8, wherein the data generation means generates training data which includes the set of new data and a class label of the predetermined class.

(Supplementary Note 10)

10. A learning device comprising:
   the data augmentation device according to any one of supplementary notes 1 to 9;
   a discrimination means configured to extract features from a data group of the source domain and a data group of the target domain which includes the set of new data, by using a model, and discriminate a class;
   a learning means configured to train the model in order to minimize an error between a discrimination result of the class and a correct answer label, and to minimize an error between features extracted from data of the source domain and features extracted from data of the target domain.

(Supplementary Note 11)

11. A data augmentation method comprising:
   acquiring two sets of source domain data of a predetermined class from a data group of a source domain, and acquiring one set of target domain data of the predetermined class from a data group of a target domain;
   estimating a structure of a manifold representing a data distribution of the source domain by using the two sets of source domain data; and
   generating a set of new data of the target domain by using the one set of target domain data and the structure of the manifold.

(Supplementary Note 12)

12. A recording medium storing a program, the program causing a computer to perform a process comprising:
   acquiring two sets of source domain data of a predetermined class from a data group of a source domain, and acquiring one set of target domain data of the predetermined class from a data group of a target domain;
   estimating a structure of a manifold representing a data distribution of the source domain by using the two sets of source domain data; and
   generating a set of new data of the target domain by using the one set of target domain data and the structure of the manifold.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

2 Source domain database
3 Target domain database
10 Data augmentation device
12 Processor
21, 121, 221 Source domain data acquisition unit
23 Inter-sample distance calculation unit
15 24, 132 Data generation unit
112, 122, 212, 222 Minor class data extraction unit
113, 123, 213, 223 Major class data extraction unit
115, 125, 215, 225 Feature extraction unit
116, 216, 216, 226 Domain adaptation unit
131 Distance calculation unit

What is claimed is:

1. A data augmentation device comprising:
   a first memory storing instructions; and
   one or more first processors configured to execute the instructions to:
   acquire two sets of source domain data of a predetermined class from a data group of a source domain, and acquire one set of target domain data of the predetermined class from a data group of a target domain;
   estimate a structure of a manifold representing a data distribution of the source domain based on a difference vector between features of the two sets of source domain data by using the two sets of source domain data; and
   generate a set of data having the difference vector from one set of target domain data in the data distribution of the target domain as a set of new data of the target domain by using the one set of target domain data and the structure of the manifold in a distribution of the target domain.

2. The data augmentation device according to claim 1 wherein the first processor generates the set of new data by weighing the distance.

3. The data augmentation device according to claim 1, wherein the first processor randomly acquires the one set of target domain data from the data group of the target domain.

4. The data augmentation device according to claim 1, wherein the first processor acquires, as the one set of target domain data, a set of data corresponding to a representative value of features of the data group of the target domain.

5. The data augmentation device according to claim 1, wherein the first processor acquires the two sets of source domain data from the data group of the source domain.

6. The data augmentation device according to claim 1, wherein the predetermined class corresponds to a class in which the number of sets of data in the target domain is equal to or greater than a predetermined number.

7. The data augmentation device according to claim 1, wherein the first processor generates training data which includes the set of new data and a class label of the predetermined class.

8. A learning device comprising:
   the data augmentation device according to claim 1;
   a second memory storing instructions; and
   one or more second processors configured to execute the instructions to:
   extract features from a data group of the source domain and a data group of the target domain which includes the set of new data, by using a model, and discriminate a class;
   train the model in order to minimize an error between a discrimination result of the class and a correct answer label, and to minimize an error between features extracted from data of the source domain and features extracted from data of the target domain.

9. A data augmentation method comprising:
   acquiring two sets of source domain data of a predetermined class from a data group of a source domain, and acquiring one set of target domain data of the predetermined class from a data group of a target domain;
   estimating a structure of a manifold representing a data distribution of the source domain based on a difference vector between features of the two sets of source domain data by using the two sets of source domain data; and generating a set of data having the difference vector from one set of target domain data in the data distribution of the target domain as a set of new data of the target domain by using the one set of target domain data and the structure of the manifold in a data distribution of the target domain.

10. A non-transitory computer-readable recording medium storing a program, the program causing a computer to perform a process comprising:

acquiring two sets of source domain data of a predetermined class from a data group of a source domain, and acquiring one set of target domain data of the predetermined class from a data group of a target domain;

estimating a structure of a manifold representing a data distribution of the source domain based on a difference vector between features of the two sets of source domain data by using the two sets of source domain data; and generating a set of data having the difference vector from one set of target domain data in the data distribution of the target domain as a set of new data of the target domain by using the one set of target domain data and the structure of the manifold in a data distribution of the target domain.

* * * * *